106. COMPOSITIONS, COATING OR PLASTIC.

91

Patented Nov. 14, 1939

2,179,754

UNITED STATES PATENT OFFICE 2,179,754

STUCCO CEMENT COMPOSITION

Vito Morgero, Providence, R. I.

No Drawing. Application April 25, 1938,
Serial No. 204,193

3 Claims. (Cl. 106—27)

This invention relates to stucco cement coatings and is directed more particularly to a waterproof coating for exterior use.

A great deal of trouble has been experienced with ordinary stucco cement coatings, particularly on the walls of buildings, due to water seeping through the coating when driving or prolonged rain storms are prevalent. In some cases, the seepage has been so great that the interior of the house has been damaged, although in any case, the adsorption of water by the stucco is undesirable even in amounts insufficient to cause any damage within the building.

The stucco coating is usually placed on a wooden lath or expanded metal support. In the case of a wooden lath, the adsorption of water by the stucco causes the wooden lath to swell while damp and shrink when again dried. This change in volume of the wood causes the stucco to crack and loosen and eventually portions of the stucco fall out leaving unsightly areas in the walls. The use of expanded metal as a support for the stucco has overcome this difficulty to a large extent, however, the repeated wetting of the expanded metal causes it to rust and deteriorate. Furthermore the wooden studding to which the expanded metal is fastened is still subject to swelling, shrinking and warping due to this moisture condition.

Various waterproofing compounds are available on the market for painting over the stucco to overcome the aforementioned conditions, however, these preparations are more or less expensive and the labor for applying them is even more expensive. Furthermore, these coatings must be renewed from time to time to remain effective.

It is the primary object of the present invention to provide a novel cement stucco composition which may be easily mixed and applied and which, when dry, is highly waterproof and is practically and substantially entirely non-adsorbent with respect to water or other liquids.

Another object is to provide a cement stucco of novel composition which is capable of being worked and shaped in the usual manner so that no special skill is necessary for the mixing or application thereof to the walls of the building.

A further object is to provide a cement stucco composition of the aforesaid character which may be colored to any desired tint or shade by the addition of coloring materials in the usual manner and without in any manner affecting the waterproof qualities of the coating.

A still further object is to provide a waterproof cement stucco composition which shall be strong and durable and which shall be waterproof, crackproof and fireproof.

In practicing my invention, I prefer to apply my stucco coating in two coats, first a scratch coat which is allowed to dry and then a finish coat is applied over the scratch coat, although it will be understood that under some conditions, a single coat could be used, either of the scratch coat composition or of the finish coat composition described more fully hereinafter.

As an example of the scratch coat which I prefer to use, I mix together in the usual manner, the following ingredients in substantially the proportional ratios specified for any given quantity:

| | | |
|---|---|---|
| Portland cement | lb | 1 |
| Rock wall plaster | lb | 1 |
| Sand | lbs | 3 |
| Liquid consisting of equal parts of milk and water | ounces | 6 |

It will be understood that the above ratio of ingredients is illustrative of the preferred composition of the scratch coat, and that slight variations are considered to be within the spirit of my invention. In the case of the liquid, I could use all milk without dilution with water, but for economical reasons, I prefer to dilute the milk with equal parts of water.

I believe my discovery of the use of milk as part or all of the liquid in the above composition is the novel and essential reason for the excellent waterproof and other desirable properties of my composition. If water alone is used as the liquid for this composition, I find that the scratch coat is too hard and does no possess sufficient elasticity to provide a good scratch coat. Also, such coat is too porous and absorbs liquid from the finish coat too fast to provide the aforementioned waterproof and other desirable qualities of the finished coating.

After the scratch coat has dried to the usual extent, a finish coat is applied thereover. As an example of my preferred finish coat composition, I mix together in the usual manner, the following ingredients in substantially the proportional ratios specified for any given quantity:

| | | |
|---|---|---|
| Sand | lbs | 2 |
| Portland cement | lb | 1 |
| Gypsum plaster | lb | ¼ |
| Milk | oz | 6 |

The sand and Portland cement are those usually employed for stucco coatings. Likewise, the gypsum plaster is any approved brand available on the market, such as "Blue Seal" rock wall plaster. The milk, which is the novel ingredient and to which I attribute the remarkable properties of the finished coating, is preferably raw cow's milk, although pasteurized milk may be used with an increase in the cost of the composition.

If desired, any suitable coloring material commonly used in stucco coatings may be incorporated in either the scratch coat, or the finish coat, or both coats without affecting the waterproof and other desirable properties of my improved composition.

I have found from actual use that stucco prepared in the above manner is entirely waterproof, crackproof and fireproof. It may be easily worked in the usual manner and hence requires no special skill. A test slab made as described above was subjected to water for several hours but showed no visible signs of absorption of the water. The slab was then baked in an oven at an elevated temperature for several hours but showed no cracks, decomposition or other signs of changes as a result of the heat treatment.

It will be understood that the proportional ratios of the ingredients of the finish coat may be varied within reasonable limits without departing from the spirit of my invention and the appended claims.

What I claim is:

1. A stucco cement coating made from the following ingredients in substantially the proportional ratios specified:

| | | |
|---|---|---|
| Cement | lb | 1 |
| Rock wall plaster | lb | 1 |
| Sand | lbs | 3 |
| Water | oz | 3 |
| Milk | oz | 3 |

2. A stucco cement coating made from the following ingredients in substantially the proportional ratios specified:

| | | |
|---|---|---|
| Sand | lbs | 2 |
| Portland cement | lb | 1 |
| Gypsum plaster | lb | ¼ |
| Milk | oz | 6 |

3. A stucco cement coating for the exterior walls of buildings comprising sand, plaster, Portland cement and milk, the sand being in proportion of at least twice the weight of the Portland cement, and the amount of plaster being not greater than the weight of the Portland cement.

VITO MORGERO.